(12) United States Patent
Van Rooyen (10) Patent No.: US 7,717,216 B2
(45) Date of Patent: May 18, 2010

(54) AUTOMATIC SAFETY BELT RELEASE

(75) Inventor: Roelof Van Rooyen, Alberton (ZA)

(73) Assignee: Roelof T.I Van Rooyen, Alberstdal, Alberton, Gauteng (ZA)

( * ) Notice: Subject to any disclaimer, the term of this patent is extended or adjusted under 35 U.S.C. 154(b) by 0 days.

(21) Appl. No.: 12/019,476

(22) Filed: Jan. 24, 2008

(65) Prior Publication Data

US 2008/0116681 A1    May 22, 2008

(51) Int. Cl.
*B60R 22/32* (2006.01)
(52) U.S. Cl. .................... 180/268; 297/485; 280/801.1; 83/639.4
(58) Field of Classification Search ................ 297/468, 297/485; 280/801.1, 808; 180/268; 30/DIG. 4, 30/180; 83/639.1–639.7; B60R 22/32
See application file for complete search history.

(56) References Cited

U.S. PATENT DOCUMENTS

| | | | | |
|---|---|---|---|---|
| 3,142,219 A | * | 7/1964 | Martin | .................. 83/639.4 |
| 3,897,963 A | * | 8/1975 | Seiffert et al. | ............... 280/802 |
| 4,174,015 A | * | 11/1979 | Farcinade | ................... 180/268 |
| 4,191,421 A | * | 3/1980 | Lechter | ....................... 297/483 |
| 4,273,361 A | | 6/1981 | Takei et al. | |
| 4,553,625 A | * | 11/1985 | Tsuge et al. | ................. 180/268 |
| 5,165,498 A | * | 11/1992 | Garboli et al. | .............. 180/268 |
| 5,531,479 A | | 7/1996 | Bauer | |
| 5,580,086 A | | 12/1996 | McAlister | |
| 5,588,672 A | | 12/1996 | Karlow et al. | |
| 5,765,660 A | * | 6/1998 | Ambrosi | ..................... 180/268 |
| 5,899,399 A | | 5/1999 | Brown et al. | |
| 6,123,166 A | * | 9/2000 | Verellen | ..................... 180/268 |
| 7,201,248 B1 | * | 4/2007 | Shaw | .......................... 180/268 |
| 7,246,676 B2 | * | 7/2007 | Cantu | .......................... 180/268 |

* cited by examiner

*Primary Examiner*—Ruth Ilan (57) ABSTRACT

This patent discloses a system to release a seatbelt in a vehicle automatically. The system may include a seatbelt sensor, mishap sensors, a controller, and a guillotine unit. The controller may communicate signals with the seatbelt sensor and mishap sensors and the guillotine unit may receive signals from the controller. The guillotine unit may include a webbing guide, a gas chamber having a supply of pressurized gas, and a gas supply line connected between the webbing guide and the gas chamber. The webbing guide may include spring biased piston and a blade attached to the piston at a positioned above a seatbelt webbing of the seatbelt. On receiving a cut signal from the controller, pressurized gas from the gas chamber may be released to cause the piston to move the blade through the seatbelt webbing to slice through seatbelt webbing.

18 Claims, 7 Drawing Sheets

AUTOMATIC SAFETY BELT RELEASE

BACKGROUND

Priority is claimed to South Africa patent application no. 2003/4782 filed in South Africa on Jun. 20, 2003, the entire disclosure of which is incorporated herein by reference.

1. Field

The information disclosed in this patent relates to a system to release a seatbelt in a vehicle automatically.

2. Background Information

A seatbelt, sometimes called a safety belt, may be viewed as a safety harness to secure the occupant of a vehicle against harmful movement that may result from a collision or a sudden stop. As part of an overall occupant restraint system, seatbelts may reduce injuries by stopping the wearer from hitting hard interior elements of the vehicle or other passengers and by preventing the wearer from being thrown from the vehicle.

While seatbelts are beneficial in protecting people from an initial collision, their restraining feature may pose serious problems should the vehicle catch fire, overturn, fall into a lake, or experience some other mishap. Worldwide, thousands of people including infants are trapped in their vehicles due to head on collisions, vehicles over turning, or vehicles catching fire.

Due to the immense force the body exerts onto the seatbelt unlocking mechanism during a collision, the seatbelt unlocking mechanism invariably is twisted in such a way that neither rescuer nor the trapped person can reach the unlocking mechanism. In the panic situation often following a collision, bystanders run around the vehicle searching for something to release the safety belt. It is during this time that accident victims suffer significant harm. What is needed is system to overcome these and other problems.

SUMMARY

This patent discloses a system to release a seatbelt in a vehicle automatically. The system may include a seatbelt sensor, mishap sensors, a controller, and a guillotine unit. The controller may communicate signals with the seatbelt sensor and mishap sensors and the guillotine unit may receive signals from the controller. The guillotine unit may include a webbing guide, a gas chamber having a supply of pressurized gas, and a gas supply line connected between the webbing guide and the gas chamber. The webbing guide may include spring biased piston and a blade attached to the piston at a positioned above a seatbelt webbing of the seatbelt. On receiving a cut signal from the controller, pressurized gas from the gas chamber may be released to cause the piston to move the blade through the seatbelt webbing to slice through seatbelt webbing.

DETAILED DESCRIPTION

Figure 1:
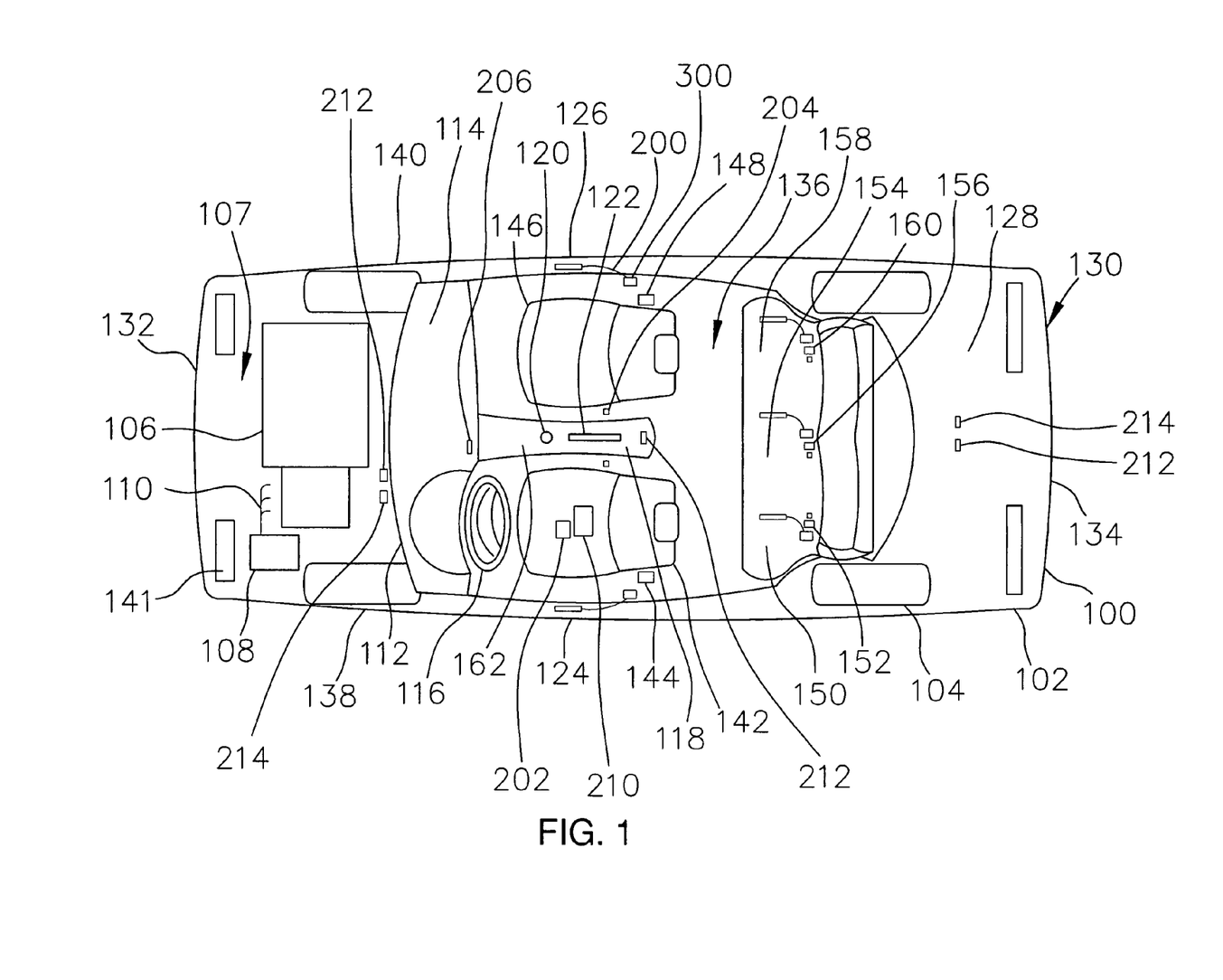
FIG. 1 is a plan view of a vehicle 100 having a system 200 to release a seatbelt in vehicle 100 automatically.

FIG. 1 is a plan view of a vehicle 100 having a system 200 to release a seatbelt in vehicle 100 automatically. In the event that vehicle 100 suffers a mishap, such as a collision, catches fire, or is immersed in water, system 200 may activate after a predetermined time to slice through the webbing of each fastened seatbelt to release each seatbelt. With each fastened seatbelt released, each person in vehicle 100 may be free to escape the vehicle interior or be freed by others for prompt medical assistance on the scene. System 200 may help reduce unnecessary pain and suffering, as well as possible death inside vehicle 100 if vehicle 100 suddenly caught fire or sank within a lake.

Vehicle 100 may be a conveyance configured to transport people, such as a car, train, ship, or aircraft. Include with vehicle 100 may be a vehicle frame 102, tires 104, an engine 106, a hood 107, a vehicle battery 108 to power and receive charge from a vehicle electrical system 110, an engine firewall 112, a dashboard 114, a steering wheel 116, a center console 118, a gear shifter 120, a parking brake 122, a driver door 124, a passenger door 126, and a trunk 128. Each may be positioned relative to elements of vehicle 100.

Tiers 104 may be distributed around vehicle frame 102 on a vehicle frame bottom 130 to encounter a ground. Engine 106 may be attached to vehicle frame 102 near a vehicle front 132 and trunk 128 may be attached to vehicle frame 102 near a vehicle rear 134. Vehicle battery 108 may be positioned near engine 106 and vehicle electrical system 110 may be distributed throughout vehicle frame 102. Engine firewall 112 may separate engine 106 from a passenger compartment 136 and trunk 128 may reside between passenger compartment 136 and vehicle rear 134.

Dashboard 114 may be connected to vehicle frame 102 between engine firewall 112 and passenger compartment 136. Steering wheel 116 may be connected near driver door 124 to tires 104 through dashboard 114. Center console 118 may be positioned within passenger compartment 136, and include gear shifter 120 and parking brake 122 where gear shifter 120 may be positioned between parking brake 122 and dashboard 114. Driver door 124 may be attached to vehicle frame 102 on a vehicle left side 138 and passenger door 126 may be attached to vehicle frame 102 on a vehicle right side 140.

Vehicle frame 102 may be a structure to support parts of vehicle 100. Each tire 104 may be part of a circular object that, together with an axle, may allow low friction motion of vehicle 100. Engine 106 may convert thermal energy to mechanical work that may rotate tires 104. Hood 107 may be a protective covering having a metal part that may cover engine 106. Vehicle battery 108 may be a device to store energy and make it available in an electrical form. Vehicle electrical system 110 may include a wire distribution system and equipment in vehicle 100 that may provide electricity to start engine 106, ignite fuel within engine 106, and operate lights 141, windshield wipers, heater, air conditioner, and radio of vehicle 100.

Engine firewall 112 may be a heat and fire resistant barrier that may keep heat from engine 106 outside of passenger compartment 136. Dashboard 114 may be a padded instrument panel located under a front windscreen having indicators, dials, and controls such as tachometer/speedometer and odometer. Steering wheel 116 may be a type of steering control that may be manipulated by a driver to control the rest of the steering system of vehicle 100, including tires 104.

Vehicle 100 additionally may include a driver seat 142 served by a driver seatbelt 144, a front passenger seat 146 served by a right front passenger seatbelt 148, a left rear passenger seat 150 served by a left rear passenger seatbelt 152, a middle rear passenger seat 154 served by a middle rear passenger seatbelt 156, and a right rear passenger seat 158 served by a right rear passenger seatbelt 160.

Center console 118 may include control-bearing surfaces in a center front of passenger compartment 136 and may occupy an area beginning in dashboard 114, continuing beneath dashboard 114, and extending between driver seat 142 and front passenger seat 146 as part of a transmission cover 162. Gear shifter 120 may be a lever to change gears in vehicle 100 that may extend away from transmission cover 162. Parking brake 122 may be a hand-operated lever to slow or stop vehicle 100, with gear shifter 120 positioned between parking brake 122 and dashboard 114. Driver door 124 and passenger door 126 each may be a swinging barrier that may close an entrance to passenger compartment 136. Trunk 128 may be a compartment to carry luggage, shopping, tools, or other items in a location that may be remote from passenger compartment 136.

Diver seat 142 may be positioned between center console 118 and driver door 124 adjacent to steering wheel 116. Front passenger seat 146 may be positioned between center console 118 and passenger door 126. Left rear passenger seat 150, middle rear passenger seat 154, and right rear passenger seat 158 may be positioned adjacent to each other in that order so that left rear passenger seat 150 is behind driver seat 142 and right rear passenger seat 158 is behind front passenger seat 146.

Each seat 142, 146, 150, 154, and 158 may be a chair having a support for a person's back and be a location within passenger compartment 136 reserved for one person to sit. Each seat may be served by a seatbelt, such as driver seatbelt 144, right front passenger seatbelt 148, left rear passenger seatbelt 152, middle rear passenger seatbelt 156, and right rear passenger seatbelt 160. Each seatbelt may be a safety harness to secure the occupant of a vehicle seat 142, 146, 150, 154, and 158 against harmful movement that may result from a collision or a sudden stop. The seatbelts may be lap, sash, lap and sash, three-point, criss-cross, five-point harness, six-point harnesses or other types of seatbelts.

Figure 2:
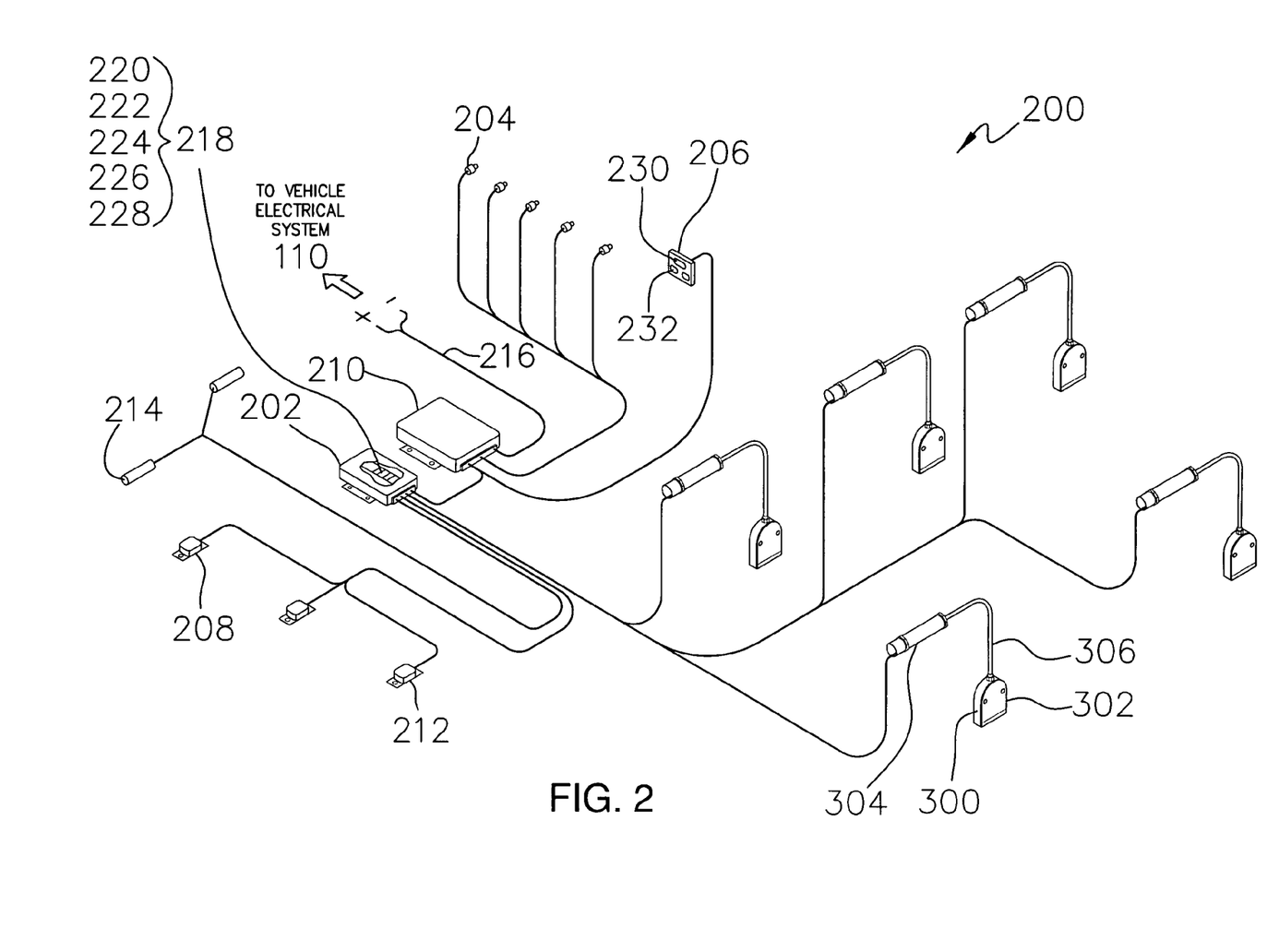
FIG. 2 is an isometric schematic view of system 200.
Figure 3:
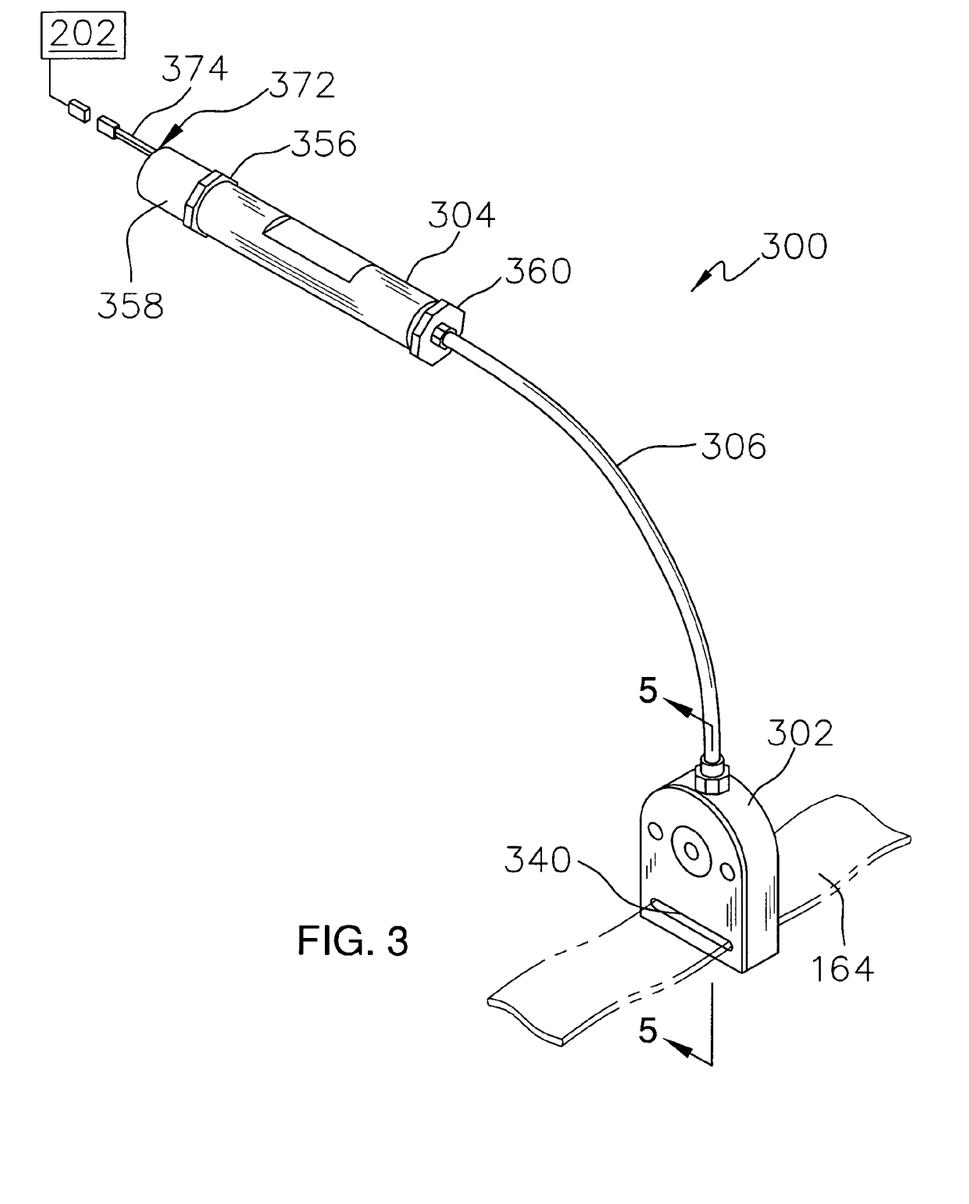
FIG. 3 is an isometric view of guillotine unit 300 about seatbelt webbing 164.

Each seatbelt 144, 148, 152, 156, and 160 may include webbing, such as seatbelt webbing 164 (FIG. 3). Seatbelt webbing 164 may be sturdy fabric woven in narrow widths that may be capable of being cut or sliced with a sharp edge. Seatbelt webbing 164 may be held in place with a seatbelt anchor at one end and a buckle on the other end and may be guided through one or more webbing guides positioned between the seatbelt anchor and buckle. As discussed in more detail below, seatbelt webbing 164 may pass through and be guided by a belt guide 302 (FIG. 2).

FIG. 2 is an isometric schematic view of system 200. System 200 may include a group of independent but interrelated elements that may cooperate to release automatically seatbelt 144, 148, 152, 156, and 160 in vehicle 100 in the event that vehicle 100 is in a collision, catches fire, is immersed in water, or suffers some other mishap. System 200 may include a controller 202, seatbelt sensors 204, seatbelt indicator panel 206, and mishap sensors 208. Mishap sensors 208 may include surround sensor 210, heat sensor 212, and water sensor 214. System 200 additionally may include a recharge supply 216, and guillotine units 300.

In general, controller 202 may receive input from various signals and provide output signals to guillotine units 300. Controller 202 may be connected to surround sensor 210, heat sensor 212, and water sensor 214, and guillotine units 300. Further, controller 202 may be connected to seat belt sensors 204, seat belt indicator panel 206, and recharge supply 216 through surround sensor 210.

Controller 202 may be a device to receive signals, perform operations on signals, and distribute signals to operate and coordinate the components of system 200. Included within controller 202 may be timers 218 to coordinate information and to delay the cutting of seatbelt webbing 164 (FIG. 3) until an appropriate time. A first timer may be a rollover timer 220, a second timer may be an impact timer 222, a third timer may be a tilt timer 224, a fourth timer may be a heat timer 226, and a fifth timer may be an immersion timer 228.

Each such timer 218 may respond based a time delay value, where that time delay value may be a function of the particular mishap experienced by vehicle 100. For example, rollover timer 220 may provide a ten-second delay to a seatbelt cut signal to account for the time between when a rollover of vehicle 100 may begin and end. Alternatively, rollover timer 220 may provide a time delay as a function of certain motion detected by surround sensor 210. Heat timer 226 may provide a one-second delay to a seatbelt cut signal to account for the time between when vehicle 100 first catches fire. Timers 218 may coordinate with each other such that the longer time delay may override shorter time delays. For example, in the event of vehicle 100 catching fire while rolling over, rollover timer 220 may override heat timer 226 since it may be important to the safety of each vehicle 100 occupant for each seatbelt 144, 148, 152, 156, and 160 to remain intact while vehicle 100 rolls over, even if vehicle 100 also is on fire. If vehicle 100 caught fire while rolling over and ended up landing in a body of water, a main concern may be drowning since the water may extinguish the fire and cause vehicle 100 to stop rolling. In one example, immersion timer 228 may override rollover timer 220, tilt timer 224, impact timer 222, and heat timer 226. Rollover timer 220 may override tilt timer 224, impact timer 222, and heat timer 226. Tilt timer 224 may override impact timer 222 and heat timer 226. Further, impact timer 222 may override heat timer 226.

Controller 202 additionally may include a computer board with resistors, relays, and diodes, and a connector block to receive information from mishap sensors 208. As an electronic timer printed circuit (PC) board, controller 202 may have a 12V rechargeable battery. Controller 202 may reside under driver seat 142 (see, for example, FIG. 1).

Seatbelt sensors 204 may include components that may determine whether a seatbelt buckle and a tongue for that buckle are locked together, such as by the mating of these two seatbelt buckle metal surfaces completing an electrical circuit to indicate that they are locked together, or be in close proximity to alter a magnetic field. This indication may permit system 200 to determine whether the webbing for a particular seatbelt should be sliced through in the event of a mishap. For example, if a seat belt sensor 204 determines that driver seatbelt 144 is fastened and middle rear passenger seatbelt 156 is not fastened, then webbing for driver seatbelt 144 may be sliced through in the event of a mishap whereas webbing for middle rear passenger seatbelt 156 may not be sliced through. This may work to prevent unnecessary damage to seatbelts 144, 148, 152, 156, and 160 of vehicle 100. In one example, there may be five seatbelt sensors 204, one for each seatbelt in vehicle 100, and each seatbelt sensor 204 may reside adjacent to one seatbelt 144, 148, 152, 156, and 160.

Seatbelt indicator panel 206 may include a flat insulated surface having light emitting diode (LED) indicator lights 230 to indicate the belt activated status of each seatbelt within vehicle 100. In one example, there maybe five LED indicator lights, one for each seatbelt in vehicle 100. In operation, a lit LED indicator light may indicate that a corresponding seatbelt buckle and a tongue for that buckle are locked together and an unlit LED indicator light may indicate that a corresponding seatbelt buckle and a tongue for that buckle are not locked together. Seatbelt indicator panel 206 further may include seatbelt indicator control switches 232 to manually control the on/off status of seatbelt indicator panel 206 and each LED indicator light 230. Seatbelt indicator panel 206 may be positioned on dashboard 114, adjacent to steering wheel 116, and above center console 118 (see, for example, FIG. 1).

Surround sensor 210 may be a device that may respond to a physical stimulus such as heat, light, sound, pressure, motion, and flow to produce a corresponding electrical signal. In one example, surround sensor 210 may detect impact, tilt, or other motion of vehicle 100 and may generate an electrical signal corresponding to that which was detected. In one example, surround sensor 210 may have a rectangular shape.

To sense motion, surround sensor 210 may include a cylindrical housing that approximately may measure 120-millimeter (mm) diameter and may have a cone shape bottom, having a height ranging from 30 mm in a center of the housing to 20 mm at a perimeter of the housing. Within the cylindrical housing may be eight micro switches positioned about a 360-degree circle to inwardly face and enclose a steel ball. The steel ball approximately may measure 17 grams and have a 16 mm diameter and may reside in an apex of the cone shaped bottom.

A bump of substantially 12 MPH (miles per hour) (about 20 kilometers per hour (Km/H)) or more from any direction (or deceleration equivalent thereof) or tilt of vehicle 100 may cause the steel ball to dislodge from the cone apex and impact one of the inwardly facing micro switches. The steel ball impacting a micro switch may send a signal from surround sensor 210 to controller 202. In response to the impact sensor or the rollover/tilt switch, controller 202 may send a signal to activate a one or more timer 218 within controller 202 (rollover timer 220, impact timer 222, and/or tilt timer 224). Timer 218 may count anywhere from 15 seconds to 45 seconds before permitting a signal to be forwarded to the appropriate guillotine units 300. The signal delay from timer 218 may allow enough time for vehicle 100 to come to a stop before guillotine units 300 slice through seatbelt webbings 164. At the end of this predetermined period, controller 202 may send a signal to the appropriate guillotine units 300 to slice through seatbelt webbing 164. There may be one impact sensor for each seatbelt, such as seatbelt 144, 148, 152, 156, and 160. Surround sensor 210 may be situated under driver seat 142 beneath carpet.

Included as part of surround sensor 210 may be a rollover/tilt switch. The rollover/tilt switch may be a mercury switch situated under driver seat 142. The mercury switch may be a switch with mercury and electrical contact enclosed in a bulb, which when the bulb is in a certain position, the mercury spans the contact to complete the circuit to allow electrical current to flow. A rollover switch/tilt switch/mercury switch contact may be made when vehicle 100 starts rolling.

Heat sensor 212 may be a device that may respond to a physical stimulus such as heat, light, sound, pressure, motion, and flow to produce a corresponding electrical signal. In one example, heat sensor 212 may respond to a predetermined temperature, such as approximately 360 degrees Fahrenheit (180 degrees Celsius). Heat sensor 212 may include a thermocouple to convert heat energy directly into electrical energy and include two dissimilar metallic conductors connected in a closed loop that may generate an electrical current proportional to a temperature difference experienced by the two loops.

On detecting that predetermined temperature, heat sensor 212 may send a signal to controller 202 for processing. The sent signal may result in the webbing of seatbelts 144, 148, 152, 156, and 160 being sliced through after a predetermined time per heat timer 226. In one example, system 200 may include three heat sensors 212, one positioned beneath hood 107 of vehicle 100 adjacent to engine 106, one within passenger compartment 136, and one inside trunk 128.

Water sensor 214 may be a device that may respond to a physical stimulus such as heat, light, sound, pressure, motion, and flow to produce a corresponding electrical signal. In one example, water sensor 212 may respond to high moisture content (hygrometer) or respond to being immersed in water. For example, if vehicle 100 avoids a collision by swerving or otherwise unavoidably lands in a dam/river/flood and water sensor 214 detects water, water sensor 214 may send a signal to controller 202. In turn, controller 202 may send out a signal after a predetermined time per immersion timer 228. The sent signal may cause guillotine unit 300 to slice through seatbelt webbing 164. If no belts are connected, nothing need happen in that there may be no reason to slice through any seatbelt webbing 164. In one example, there may be two water sensors 214, one located under hood 107 and one located in trunk 128.

Recharge supply 216 may be an electrical bus connected between surround sensor 210 and vehicle electrical system 110. Recharge supply 216 may provide power from battery 108 to a controller battery within controller 202 to maintain a proper charge in that battery. In turn, the controller battery may power system 200.

Figure 4:
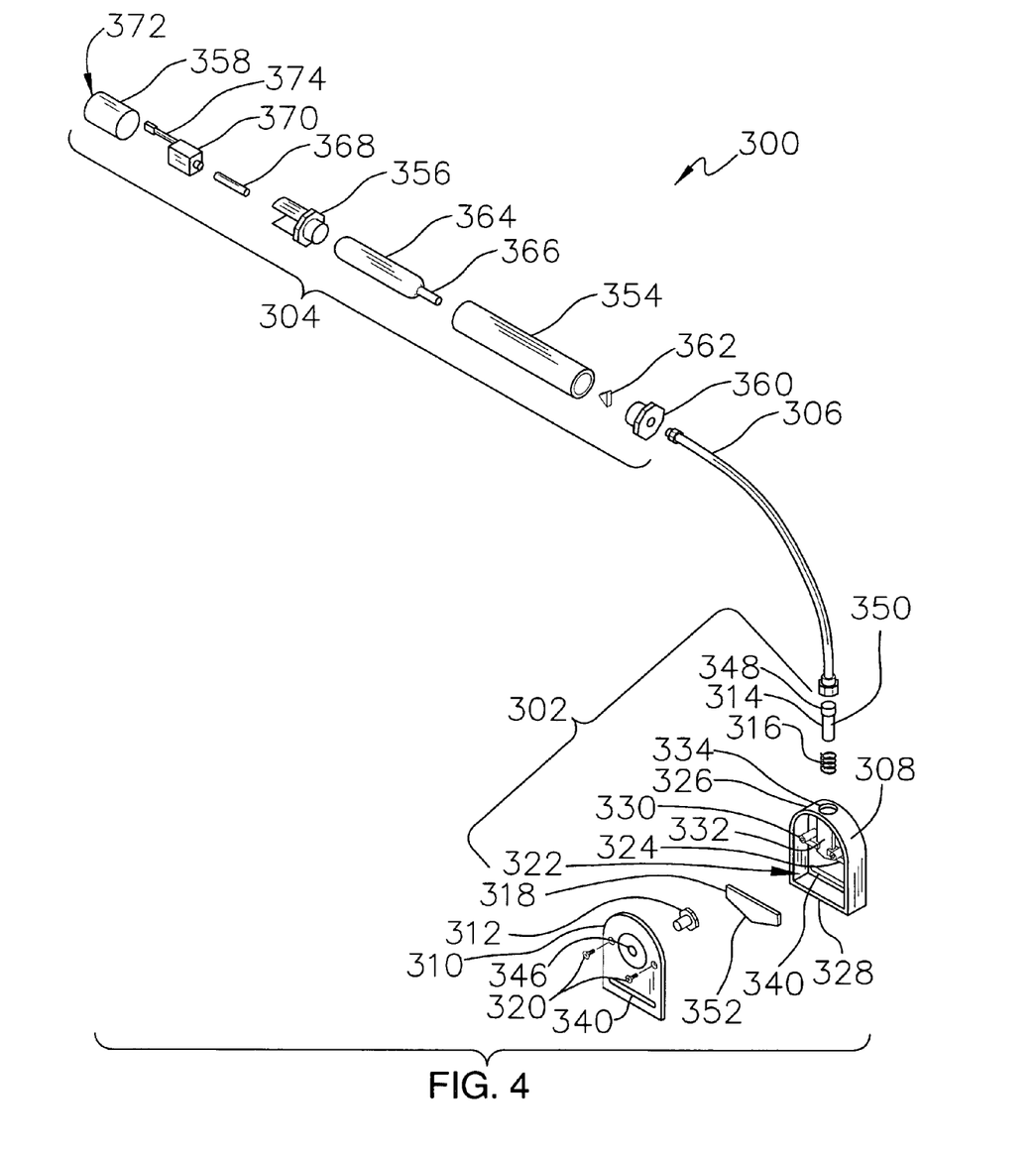
FIG. 4 is an exploded isometric view of guillotine unit 300.

FIG. 3 is an isometric view of guillotine unit 300 about seatbelt webbing 164. FIG. 4 is an exploded isometric view of guillotine unit 300. Guillotine unit 300 may be a device utilized to receive signals from controller 202 and slice through seatbelt webbing 164 in response to those received signals. The signals to guillotine unit 300 may be sent through wires or transmitted as radio waves in a wireless operation. Guillotine unit 300 may include a webbing guide 302, a gas chamber 304, and a gas supply line 306 connected between webbing guide 302 and gas chamber 304.

Figure 5:
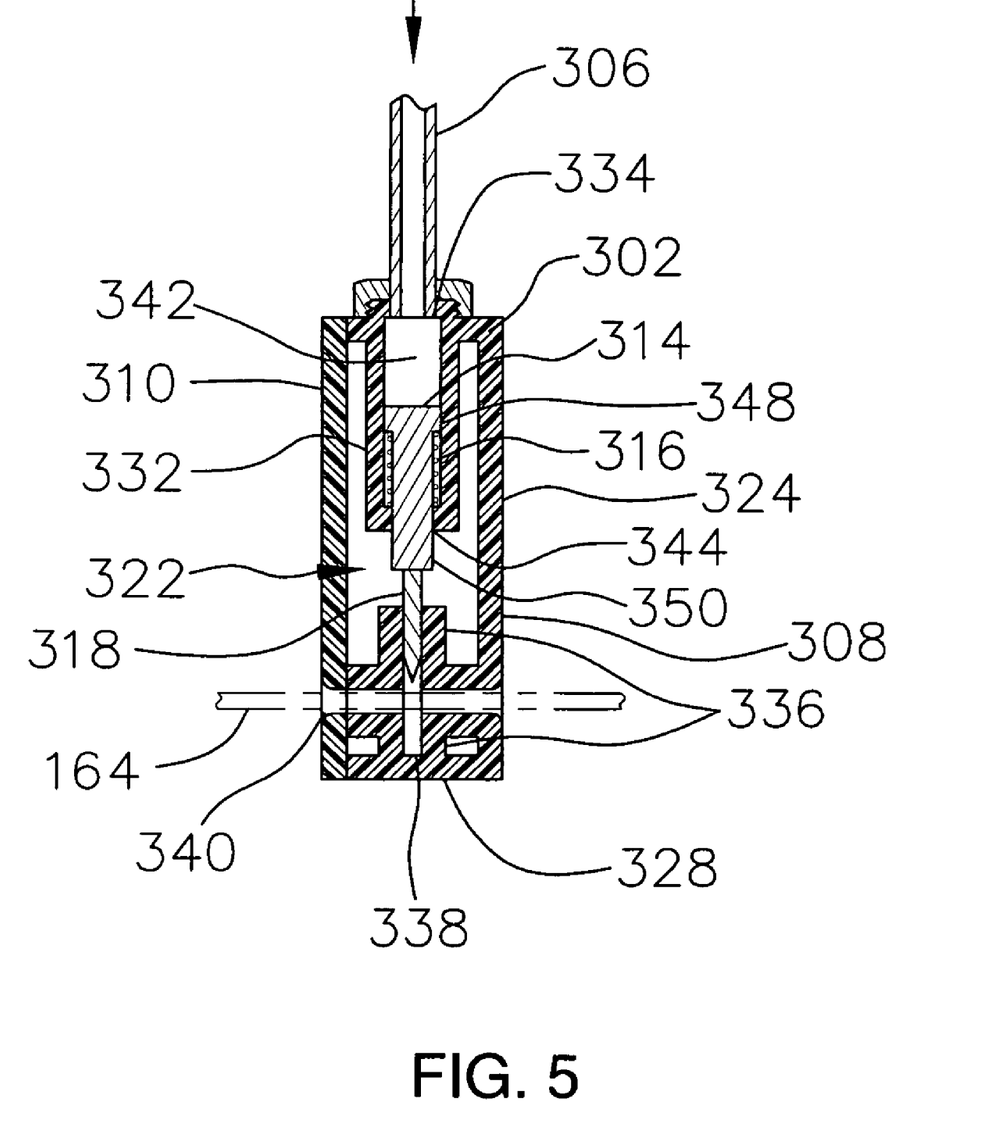
FIG. 5 is a section view of webbing guide 302 generally taken off line 5-5 of FIG. 3.

FIG. 5 is a section view of webbing guide 302 generally taken off line 5-5 of FIG. 3. Webbing guide 302 may include a guide housing 308, a back plate 310, a body mounting bolt 312, a piston 314, a piston spring 316, and a blade 318. Body mounting bolt 312 may be a threaded fastener having a head and configured to be used in conjunction with an internal screw thread fixed to vehicle 100. In addition, body mounting bolt 312 may be passed through back plate 310 and secured to vehicle 100 at a position relative to one of seatbelt 144, 148, 152, 156, and 160 (FIG. 1).

Guide housing 308 may be secured against back plate 310 such as by screws 320 to form a guide interior 322. Piston 314, piston spring 316, and blade 318 each may be retained within guide interior 322. Seatbelt webbing 164 may pass through webbing guide 302 at a position between blade 318 and guide housing 308. Blade 318 may be attached to piston 314 and piston spring 316 may work to hold up both piston 314 and blade 318 away from seatbelt webbing 164. In operation, piston 314 may be forced down using gas pressure to compress piston spring 316 and to slice through seatbelt webbing 164.

Guide housing 308 may be a protective cover to contain and support mechanical components and to provide a guide for seatbelt webbing 164. Guide housing 308 may be substituted in place of existing seatbelt webbing guides within vehicle 100. Guide housing 308 may include a front wall 324, a U-shape side 326 attached to and following front wall 324, and a bottom wall 328 perpendicularly attached to and following along front wall 324 to connect U-shape side 326 with itself. Guide housing 308 additionally may include screw bosses 330, a piston support 332 having a piston first opening 334, a blade guide 336 having a blade slot 338, and a webbing slot 340. In one example, guide housing 308 may be made of a durable plastic.

Front wall 324, U-shape side 326, bottom wall 328, and back plate 310 may be solid structures that may help define guide interior 322 and provide protection with regard to blade 318. Front wall 324 may have material removed to define an open slot near a bottom of front wall 324 that may be part of webbing slot 340. U-shape side 326 may have material removed from an upper most portion of U-shape side 326 to define piston first opening 334. Piston first opening 334 may include internal threads to receive gas supply line 306.

Each screw boss 330 may be circular rounded projection extending from front wall 324 and having a threaded interior configured to mate with a screw 320. Piston support 332 may be a walled area defining a piston support interior 342 and having piston first opening 334 and a piston second opening 344 that may include a diameter that may be smaller than a diameter of piston first opening 334. Piston support interior 342 may be shaped to receive and guide piston 314 and piston spring 316.

Blade guide 336 may be a rigid structure having two parts, with a first part attached to front wall 324 above webbing slot 340 and a second part attached to front wall 324 below webbing slot 340 to be enclosed by bottom wall 328 to contain blade 318 and to prevent blade 318 from injuring people. Bottom wall 328 may be thick. Blade slot 338 may be a narrow, elongated discontinuous passageway though blade guide 336 that may be configured to guide blade 318 in movement relative to seatbelt webbing 164.

Webbing slot 340 may be a narrow, elongated discontinuous passageway though front wall 324 and back plate 310 that may be configured to guide seatbelt webbing 164 below blade 318 in movement relative to belt guide 302. In one example, webbing slot 340 approximately may have a 5 mm width and be 60 mm long. Seatbelt webbing 164 may be threaded through webbing slot 340 to be positioned perpendicular to blade 318 within guide interior 322 so that blade 318 may be 5 mm above seatbelt webbing 164.

Back plate 310 may include a part of webbing slot 340 and may include a body-mounting bolt hole 346 through which body mounting bolt 312 may pass. In one example, back plate 310 may be a flat piece of steel substantially measuring 5 millimeter (mm) thick, 85 mm long at its greatest length, and 40 mm wide.

Piston 314 may be a solid plug configured to move up and down within piston support interior 342. Included with piston 314 may be a piston head 348 connected to a piston shaft 350. Piston head 348 may have a larger diameter than that of piston shaft 350 to receive gas pressure and translate that pressure into a downward movement of piston 314. Piston shaft 350 may pass through piston second opening 344 whereas piston head 348 may have a larger diameter than that of piston second opening 344 to prevent piston head 348 from passing through piston second opening 344. In one example, piston 314 may be made of plastic.

Piston spring 316 may be an elastic device that may return to its shape or position when pushed, pulled, or pressed. Piston spring 316 may reside about piston shaft 350 and piston second opening 344 and reside against piston head 348 and piston support 332. Piston spring 316 may resiliently hold piston head 348 away from piston second opening 344.

Blade 318 may be an edge tool that may be used as a cutting instrument. Blade 318 may have a V-shaped cutting side 352 configured to both poke through a lateral midpoint of seatbelt webbing 164 and slice outwardly through seatbelt webbing 164. Bakkies/LDV vehicles may include two blades 318. Sedan/Station Wagon vehicles may include five blades 318. Airplane vehicles may include one-hundred twenty to two hundred blades 318. Taxis may include fifteen blades 318. In one example, the components of guillotine unit 300 may be made of durable plastic, with an exception of V-shaped cutting side 352 being made of high speed steel (HSS).

As noted above, guillotine unit 300 may include gas chamber 304 (FIG. 4). Gas chamber 304 may be an arrangement of components configured to receive a signal from controller 202 and distribute pressurized gas into gas supply line 306 in response to that signal. Gas chamber 304 may include a gas cartridge housing 354, a solenoid mounting bracket 356, a gas cartridge cap 358, a cutter holder 360, a gas cartridge cutter 362, a gas cartridge 364 having a cartridge nozzle 366, a striker pin 368, and a solenoid 370.

Gas cartridge housing 354 may be connected between solenoid mounting bracket 356 and cutter holder 360. Cutter holder 360 may be connected to gas supply line 306 and may retain gas cartridge cutter 362. Solenoid mounting bracket 356 may be connected to gas cartridge cap 358. Gas cartridge 364 may reside against solenoid mounting bracket 356 and within gas cartridge housing 354 so that cartridge nozzle 366 may be inline with gas cartridge cutter 362. Striker pin 368 may reside within solenoid 370 and solenoid mounting bracket 356 so that striker pin 368 may be inline with gas cartridge 364 and gas cartridge cutter 362. Solenoid 370 may reside within gas cartridge cap 358 and in registration with solenoid mounting bracket 356 so that striker pin 368 may be inline with gas cartridge 364 and gas cartridge cutter 362

Gas cartridge housing 354 may be a circular tube configured to protect gas cartridge nozzle 366 from damage and to contain and support other components of guillotine unit 300. Gas cartridge housing 354 may have a threaded interior to mate with solenoid mounting bracket 356 and cutter holder 360. In one example, gas cartridge housing 354 may be made of steel.

Solenoid mounting bracket 356 may be a structural support removeably projecting from gas cartridge housing 354 on which to fasten solenoid 370. Solenoid mounting bracket 356 may have external threads for fastening and a hex nut surface to receive a tool to rotate solenoid mounting bracket 356.

Gas cartridge cap 358 may be a tight-fitting headdress to enclose and protect solenoid 370. Gas cartridge cap 358 may have a gas cartridge cap hole 372 to permit a solenoid receiver 374 to extend there through.

Cutter holder 360 may be a structural support projecting from removeably gas cartridge housing 354 on which to fasten as cartridge cutter 362. Cutter holder 360 may have external threads and internal threads for fastening and a hex nut surface to receive a tool to rotate cutter holder 360. Cutter holder 360 may attach to gas supply line 306.

Gas cartridge cutter 362 may be an implement to slice through cartridge nozzle 366. Gas cartridge cutter 362 may be fixed to cutter holder 360. In one example, gas cartridge cutter 362 may have a triangular shape having apexes, where one apex may be positioned within cartridge nozzle 366

Gas cartridge 364 may be a cylindrical casing containing a pressurized gas that may act as a motive force to urge blade 318 through seatbelt webbing 164. Cartridge nozzle 366 may be a restriction at an end of the cylindrical casing through which pressurized gas may enter and exit gas cartridge 364. Cartridge nozzle 366 may be made of a material or include a thin membrane plug made of a material that may be breached by gas cartridge cutter 362. Gas cartridge 364 may include a carbon dioxide ($CO_2$) chamber pressurized with carbon dioxide configured to provide +10 kilograms (kg) of force.

Solenoid 370 may include an electromagnetic coil wound in the shape of a hollow spool to move striker pin 368 against gas cartridge 364 on receiving a signal through solenoid receiver 374. Solenoid 370 may be powered with 12-volts received from vehicle electrical system 110 (FIG. 2) or from a battery. Striker pin 368 may be a rigid, slender, short shaft made of a material that may move in response to electromagnetic force. Solenoid receiver 374 may be an electronic device that may take delivery of a wire or radio signal from controller 202 for processing by solenoid 370. In one example, solenoid 370 may be a micro switch/activating switch.

As noted above, guillotine unit 300 may include gas supply line 306 (FIG. 4). Gas supply line 306 may be a flexible, hollow tube configured to transmit pressurized gas from gas cartridge 364 into piston support interior 342 (FIG. 5). Gas supply line 306 may be connected between cutter holder 360 (FIG. 4) and piston first opening 334. In one example, gas supply line 306 may be made of polyvinylchloride (PVC).

In operation, a signal generated by impact, rollover, fire, or water and received by solenoid 370 may cause striker pin 368 to strike gas cartridge 364 so that cartridge nozzle 366 moves forward into cutter blade 362. Cutter blade 362 then may be breach cartridge nozzle 366 such as by puncturing cartridge nozzle 366 to open gas cartridge 364. Pressurized gas within gas cartridge 364 may then exit gas cartridge 364, pass around cutter blade 362 and travel through gas supply line 306 to press against piston head 348 and cause piston 314 to move downward. Blade 318 may move downward with piston 314 to impact and slice through seatbelt webbing 164. A separation of seatbelt webbing 164 may release its associated seatbelt 144, 148, 152, 156, and 160 so that the occupant is no longer restrained by that seatbelt. In short, once system 200 is activated, gas from gas propellant chamber 364 may force piston 314 down and through seatbelt webbing 164 to release a trapped person from that person's seat.

Figure 6:
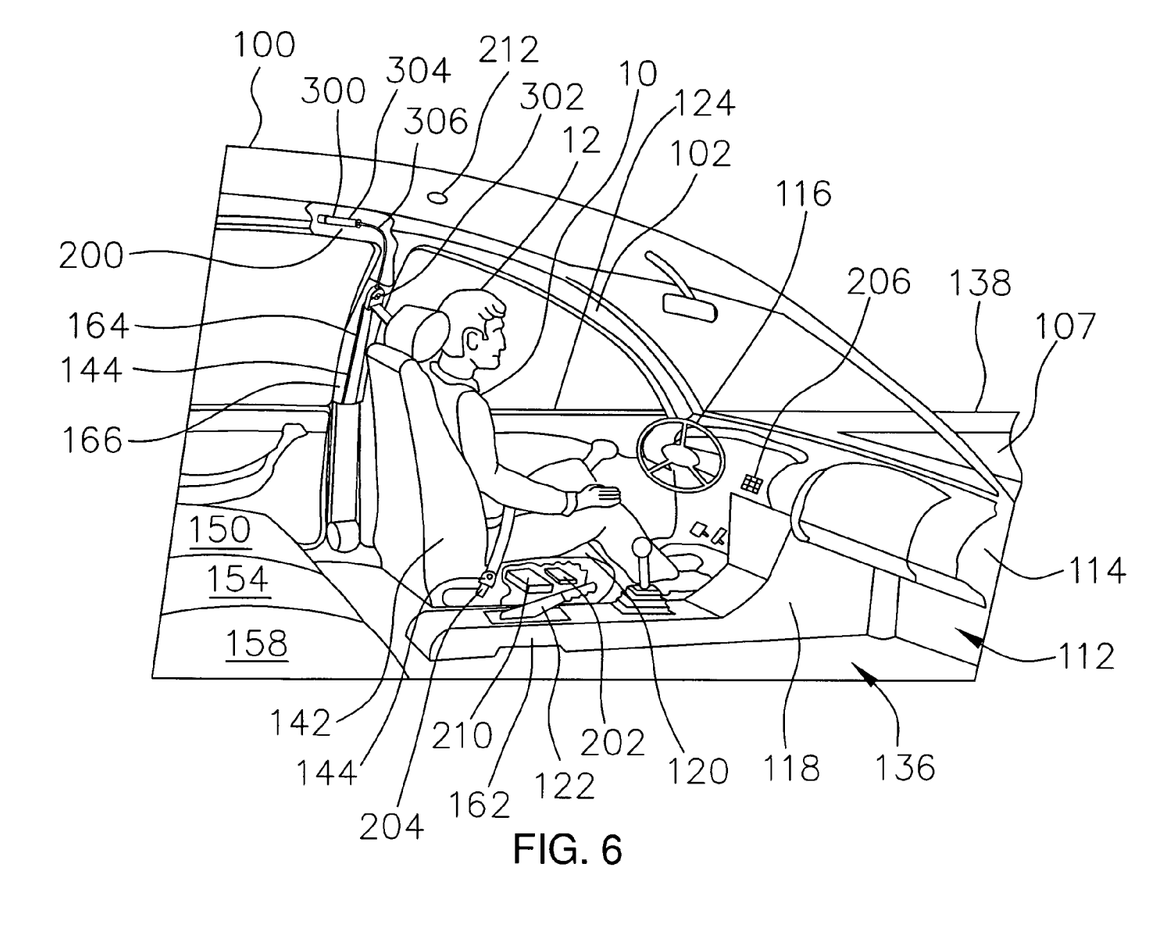
FIG. 6 is a partial isometric view of vehicle 100 having system 200 to release driver seatbelt 144 automatically.

FIG. 6 is a partial isometric view of vehicle 100 having system 200 to release driver seatbelt 144 automatically. Guillotine unit 300 may be situated on a driver's side to a left of a head 12 of driver 10 on a vehicle left side 138 of vehicle 100 on an upright pillar 166 of vehicle 100. In this example, guillotine unit 300 replaced an original belt guide. Guillotine units 300 (not shown) may be situated near the head of a passenger to the left of the passenger head, near a head of a rear left passenger and a rear right passenger. A guillotine unit 300 (not shown) may be situated near a rear middle passenger beneath middle rear passenger seat 154 (FIG. 1).

Figure 7:
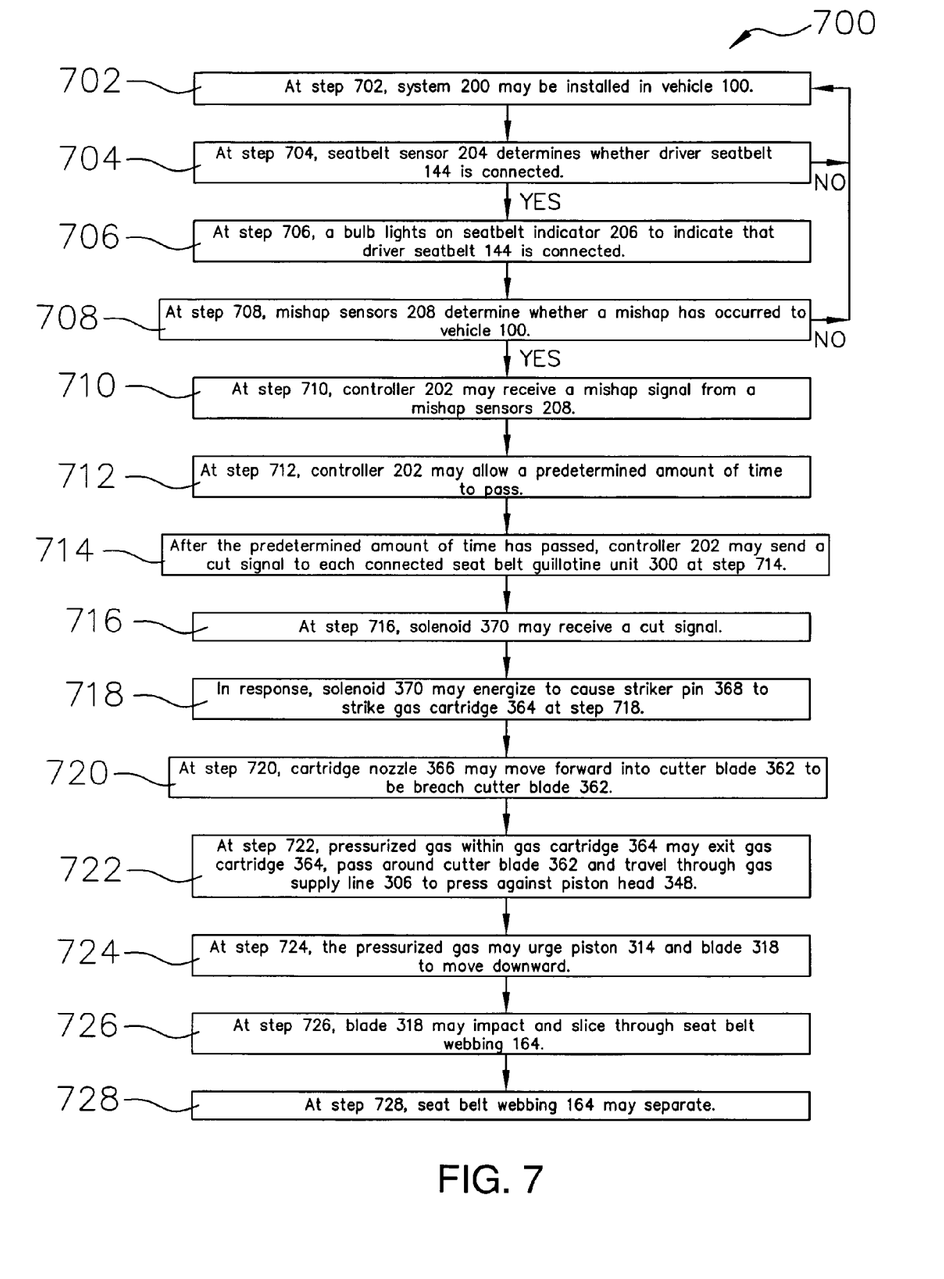
FIG. 7 is a method 700 to release driver seatbelt 144 in vehicle 100 automatically.

FIG. 7 is a method 700 to release driver seatbelt 144 in vehicle 100 automatically. At step 702, system 200 may be installed in vehicle 100. At step 704, seat belt sensor 204 determines whether driver seatbelt 144 is connected. If driver seatbelt 144 is not connected, method 700 may return to step 702. If driver seatbelt 144 is connected, method 700 may proceed to step 706.

At step 706, a bulb lights on seatbelt indicator panel 206 to indicated that driver seatbelt 144 is connected. At step 708, mishap sensors 208 determine whether a mishap has occurred to vehicle 100. If a mishap has not occurred to vehicle 100, then method 700 may return to step 702. If a mishap has occurred to vehicle 100, then method 700 may proceed to step 710.

At step 710, controller 202 may receive a mishap signal from a mishap sensor 208. At step 712, controller 202 may allow a predetermined amount of time to pass. The passage of time may allow the mishap to complete to a point where driver seatbelt 144 no longer is needed to restrain driver 10. After the predetermined amount of time has pass, controller 202 may send a cut signal to each connected seatbelt guillotine unit 300 at step 714. The cut signal may be sent by wire or wireless.

At step 716, solenoid 370 may receive a cut signal. In response, solenoid 370 may energize to cause striker pin 368 to strike gas cartridge 364 at step 718. At step 720, cartridge nozzle 366 may move forward into cutter blade 362 to be breach by cutter blade 362. At step 722, pressurized gas within gas cartridge 364 may exit gas cartridge 364, pass around cutter blade 362, and travel through gas supply line 306 to press against piston head 348.

At step 724, the pressurized gas may urge piston 314 and blade 318 to move downward. At step 726, blade 318 may impact and slice through seatbelt webbing 164. At step 728, seatbelt webbing 164 may separate. With seatbelt webbing 164 separated, driver seatbelt 164 no longer restrains driver 10 and driver 10 may move away from driver seat 142 and away from vehicle 100.

The system may be a vehicle safety system to release the seatbelts automatically following a serious accident, fire, rollover, or another serious mishap. This may enable vehicle occupants to escape the vehicle interior or be freed by others for prompt medical assistance on the mishap scene. The system may help eliminate unnecessary pain and suffering, as well as possible death inside the vehicle as it suddenly caught fire or sank within a lake. The system may work to release the safety belt on any motor vehicle, LDV, truck, or airplane.

The system may include a surround sensor impact unit, controller, rechargeable battery charge supply, seatbelt guillotines (cutters), gas propellant chambers, seatbelt lock activators, and safety belt indicator. The surround sensor may be situated under the driver's seat beneath the carpeting. The surround sensor may have micro-switches 360 degrees around the outside that may face inward towards each other. A 17-gram steel ball in the center measuring 16 mm in diameter may serve as an activator for the sensor switch (detecting significant impact from any direction).

Other external sensors may be included in the system. This may include a rollover/tilt mercury-style switch situated beneath the driver's seat. When the vehicle starts rolling over in a serious accident, the switch may activate a timer 218 that may be set to permit down stream activation anywhere from 15 to 45 seconds after being activated. The particular timer 218 may allow sufficient time for the vehicle to come to a complete halt before firing the guillotines on the seatbelts. Three heat sensors also may be integrated into the system. The heat sensors may be installed beneath the vehicle hood, within the vehicle interior, and inside the vehicle trunk. At a certain temperature (180 degrees), these sensors may activate the system to fire the sharp blades and cut the belts.

The controller unit may be used to perform whatever action takes place with the safety system. In an impact, fire, or rollover, the controller may react accordingly. Controller components may include two timers (one for rollover 220, one for impact 222), a 12-volt rechargeable battery, PC board, connector block from sensors, and five belt-activated indicator lights.

Each of the seatbelts within the interior may be outfitted with a guillotine assembly to slice the belt material when required. The outer housing and piston of the guillotine assembly may be plastic, with gas entry at a top of the unit—a position remote from the seatbelt webbing. A mounting plate at the rear of the guillotine assembly may be a flat piece of steel measuring 5 mm thick, 85 mm long, and 40 mm wide. The guillotine may contain a high-speed steel cutting blade measuring 60 mm long, 30 mm wide, and 3 mm thick.

At a bottom of the plate may be a 5 mm slotted opening. The safety belt may be threaded through a slot in the guillotine assembly between the plastic housing and steel plate, with the guillotine 5 mm above the safety belt. The safety belt otherwise may be anchored in the typical positions in the car. The guillotine may replace the existing belt guide above and to the side of the car on the upright pillars.

The gas propellant chamber may have a steel tube where a carbon dioxide chamber and 12-volt solenoid may be housed. One end may have a striker blade with an exit hole to the guillotine. The 12-volt solenoid may be capable of pushing the gas cartridge forward on the striker blade and puncturing a thin membrane of the carbon dioxide chamber, thereby releasing the gas via PVC tube to the guillotine.

Once the system is activated, gas from the propellant chamber may force the piston down so the sharp blade slices the safety belt. This may enable the individual to be released from the seat to escape the vehicle interior. The blade may be protected from injuring people since its plastic housing may contain a thick base to contain the protruding metal blade. All the seatbelts within the vehicle interior may be sliced simultaneously when the system is activated. The system may be integrated into new vehicle production as standard or optional equipment and may be considered for installation into aftermarket vehicles. The safety system may be utilized in aircraft.

The system may be tied into an airbag system included with the vehicle. The system may handle one to five seatbelts at once. If no belts are plugged in, the system need not activate.

The system may fulfill a need for a timed seatbelt release following collisions and other serious automotive mishaps. Appealing features of the system may be its safety, automatic operation, and effectiveness. Instead of being unable to assist another person trapped within an automobile seat following a crash, the system may slice the seatbelt automatically so the individual may be removed from the vehicle interior. This may mean a difference between life and death in a fire after an accident or when the person needed immediate medical assistance. The system may enhance post-crash safety when the vehicle catches fire, begins sinking in a lake, flips over, or may be in some other dangerous environment.

The system may prompt more motorists to wear their seatbelts while traveling. Insurance companies recognizing the possible benefits of this system may even offer reduced rates to motorists purchasing vehicles equipped with the feature. In addition, the system may be inconspicuous, reliable, and adaptable to different vehicles.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A system to release a seatbelt in a vehicle automatically, the system comprising:
    a seatbelt sensor to determine whether mating pieces of the seatbelt are fastened together;
    mishap sensors, including at least one of a surround sensor to detect motion of the vehicle, a heat sensor to detect heat conditions for a fire, and a water sensor to detect immersion of the vehicle in water;
    a controller configured to communicate signals with the seatbelt sensor and mishap sensors; and
    a guillotine unit configured to receive signals from the controller, where the guillotine unit includes a webbing guide, a gas chamber having a supply of pressurized gas, and a gas supply line connected between the webbing guide and the gas chamber, where the webbing guide includes a guide housing having therein a piston spring positioned about a piston and a blade attached to the piston at a position that is configured to be above a seatbelt webbing of the seatbelt, where the guillotine unit is responsive to signals from the controller and where the piston is responsive to the supply of pressurized gas such that when the supply of pressurized gas is passed from the gas chamber through the gas supply line to the piston, the supply of pressurized gas overcomes forces from the spring and causes the piston to move the blade through the seatbelt webbing to slice through seatbelt webbing.

2. The system of claim 1, where the guide housing includes a front wall, a U-shape side attached to and following the front wall, and a bottom wall perpendicularly attached to and following along the front wall to connect the U-shape side with itself.

3. The system of claim 2, where the guide housing additionally includes screw bosses, a piston support having a piston first opening, a blade guide having a blade slot, and a webbing slot.

4. The system of claim 3, where the blade has a V-shaped cutting side positioned and configured to both poke through a lateral midpoint of the seatbelt webbing and to slice outwardly through the seatbelt webbing.

5. The system of claim 1, where the gas chamber includes a gas cartridge housing, a solenoid mounting bracket, a gas cartridge cap, a cutter holder, a gas cartridge cutter, a gas cartridge having a cartridge nozzle, a striker pin, and a solenoid, where the gas cartridge housing is connected between the solenoid mounting bracket and the cutter holder.

6. The system of claim 5, where the cutter holder is connected to the gas supply line and retains the gas cartridge cutter, where the solenoid mounting bracket is connected to the gas cartridge cap, where the gas cartridge resides against the solenoid mounting bracket and within gas cartridge housing so that the cartridge nozzle is inline with gas cartridge cutter.

7. The system of claim 6, where the striker pin resides within the solenoid and the solenoid mounting bracket so that the striker pin is inline with the gas cartridge and the gas cartridge cutter.

8. The system of claim 7, where the solenoid resides within the gas cartridge cap and in registration with the solenoid mounting bracket so that the striker pin is inline with the gas cartridge and the gas cartridge cutter.

9. The system of claim 1 further comprising:
    timers configured to be in communication with the controller to delay signals from the controller to the guillotine unit for a predetermined time.

10. The system of claim 9, where the timers include a rollover timer, an impact timer, a tilt timer, a heat timer, and an immersion timer.

11. The system of claim 10, where the immersion timer is configured to override the rollover timer, the tilt timer, the impact timer, and the heat timer, where the rollover timer is configured to override the tilt timer, the impact timer, and the heat timer, where the tilt timer is configured to override the impact timer and the heat timer, and where the impact timer is configured to override the heat timer.

12. The system of claim 11, where the controller is positioned under a driver seat of the vehicle.

13. The system of claim 12, where there is one seatbelt sensor for each seatbelt in the vehicle.

14. The system of claim 1, further comprising:
   a seatbelt indicator panel configured to be in communication with the controller; and
   a recharge supply connected to the controller through the surround sensor.

15. The system of claim 14, where the heat sensor is configured to generate a signal in response to detecting a temperature of approximately greater than 360 degrees Fahrenheit.

16. The system of claim 15, where the water sensor is configured to generate a signal in response to being immersed in water.

17. A method to release a seatbelt in a vehicle automatically, the method comprising:
   presenting a system to release a seatbelt in a vehicle automatically, where the system includes a seatbelt sensor, mishap sensors, a controller, and a guillotine unit,
   where the seatbelt sensor is configured to determine whether mating pieces of the seatbelt are fastened together,
   where the mishap sensors include at least one of a surround sensor to detect motion of the vehicle, a heat sensor to detect heat conditions for a fire, and a water sensor to detect immersion of the vehicle in water,
   where the controller is configured to communicate signals with the seatbelt sensor and mishap sensors, and
   where the guillotine unit is configured to receive signals from the controller, where the guillotine unit includes a webbing guide, a gas chamber having a supply of pressurized gas, and a gas supply line connected between the webbing guide and the gas chamber, where the webbing guide includes a guide housing having therein a piston spring positioned about a piston and a blade attached to the piston at a position that is configured to be above a seatbelt webbing of the seatbelt, where the guillotine unit is responsive to signals from the controller and where the piston is responsive to the supply of pressurized gas such that when the supply of pressurized gas is passed from the gas chamber through the gas supply line to the piston, the supply of pressurized gas overcomes forces from the spring and causes the piston to move the blade through the seatbelt webbing to slice through seatbelt webbing;
   determining whether a driver seatbelt is connected;
   if driver seatbelt is connected, then using the mishap sensors to determine whether a mishap has occurred to the vehicle;
   if a mishap has occurred to the vehicle, then receiving a mishap signal in the controller from a mishap sensor;
   allowing a predetermined amount of time to pass;
   receiving a cut signal in the guillotine unit from the controller after the predetermined amount of time has passed; and
   passing the blade through the seatbelt webbing to slice through seatbelt webbing.

18. The method of claim 17, further comprising:
   causing a striker pin to a strike gas cartridge so that a cartridge nozzle of the gas cartridge moves forward into a cutter blade to be breach by the cutter blade and to release pressurized gas within the gas cartridge into the gas supply line.

* * * * *